United States Patent
Lenk

(10) Patent No.: US 10,979,211 B2
(45) Date of Patent: Apr. 13, 2021

(54) ENCRYPTION METHOD AND SYSTEM FOR COORDINATES

(71) Applicant: Bayerische Motoren Werke Aktiengesellschaft, Munich (DE)

(72) Inventor: Alexander Lenk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 15/944,998

(22) Filed: Apr. 4, 2018

(65) Prior Publication Data

US 2018/0294953 A1 Oct. 11, 2018

(30) Foreign Application Priority Data

Apr. 7, 2017 (EP) .................................... 17165474

(51) Int. Cl.
| | |
|---|---|
| H04L 29/06 | (2006.01) |
| H04L 9/06 | (2006.01) |
| H04L 9/00 | (2006.01) |
| H04L 9/32 | (2006.01) |

(52) U.S. Cl.
CPC .............. *H04L 9/0618* (2013.01); *H04L 9/00* (2013.01); *H04L 9/3226* (2013.01); *H04L 2209/84* (2013.01)

(58) Field of Classification Search
CPC ....... H04L 9/0618; H04L 9/00; H04L 9/3226; H04L 2209/80; H04L 2209/84; G06F 2221/2111
See application file for complete search history.

(56) References Cited

U.S. PATENT DOCUMENTS

| | | | | |
|---|---|---|---|---|
| 6,671,377 | B1 * | 12/2003 | Havinis ................. | G01S 5/0236 380/258 |
| 7,880,631 | B1 * | 2/2011 | Herz .................. | G08B 13/1409 340/635 |
| 8,054,181 | B2 * | 11/2011 | Van Wyck Loomis ..................... | G01S 19/14 340/426.15 |
| 8,583,924 | B2 * | 11/2013 | Caballero ............... | G06F 21/10 713/168 |
| 8,693,689 | B2 * | 4/2014 | Belenkiy ............... | H04L 9/0872 380/270 |
| 9,436,847 | B2 * | 9/2016 | Durham .............. | G06F 12/1408 |
| 9,705,693 | B1 * | 7/2017 | Inamdar ................ | H04W 12/02 |
| 2015/0097721 | A1 * | 4/2015 | Broussalian .......... | G01S 19/015 342/357.2 |
| 2015/0358159 | A1 | 12/2015 | Rozenberg et al. | |

OTHER PUBLICATIONS

Scanlon, William; Vehicle Usage Verification System; WO 2012/131029 (Year: 2012).*
Extended European Search Report issued in counterpart European Patent Application No. 171654742 dated Sep. 12, 2017 (Eleven (11) pages).

(Continued)

*Primary Examiner* — Hosuk Song
(74) *Attorney, Agent, or Firm* — Crowell & Moring LLP

(57) ABSTRACT

A coordinate encryption method includes the steps of encoding a coordinate with an encryption algorithm, testing whether the result of the encoding is within a predefined range, and outputting the result of the encoding in case the result of the encoding is within the predefined range.

18 Claims, 2 Drawing Sheets

(56) References Cited

OTHER PUBLICATIONS

Mershad et al. "We Can Deliver Messages to Far Vehicles", IEEE Transactions on Intelligent Transportation Systems, IEEE, Piscataway, NJ, USA, vol. 13, No. 3, Sep. 1, 2012, p. 1099-1115, XP011472556.

Beaulieu et al. "The Simon and Speck Families of Lightweight Block Ciphers", International Association for Cryptologic Research, vol. 20130620:112335, Jun. 19, 2013, p. 1-45, XP061007859.

Thomaidis et al. "Target Tracking and Fusion in Vehicular Networks", Intelligent Vehicles Symposium (IV), 2011 IEEE, IEEE, Jun. 5, 2011, p. 1080-1085, XP031999045.

\* cited by examiner

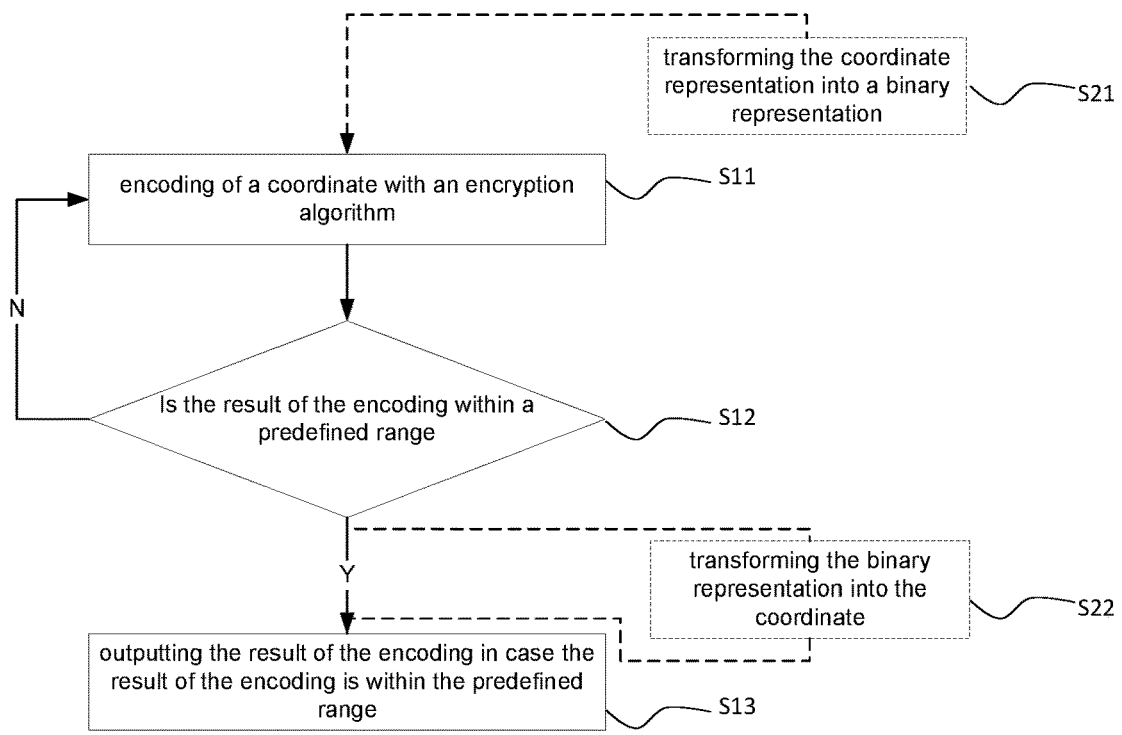
Fig. 1
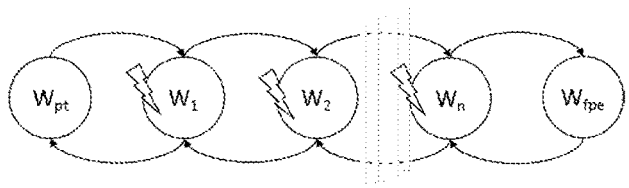
Fig. 2
|  | GeoFPE | AES | 3DES |
| --- | --- | --- | --- |
| Average | 0,011461401 | 0,014271078 | 0,020570752 |
| Minimum time | 0,004908 | 0,009817 | 0,015172 |
| Maximum Time | 4,396298 | 3,52882 | 3,033946 |
| Variance | 0,00046849 | 0,000560171 | 0,00079365 |
Fig. 3

ENCRYPTION METHOD AND SYSTEM FOR COORDINATES

CROSS REFERENCE TO RELATED APPLICATION

This application claims priority under 35 U.S.C. § 119 from European Patent Application No. 17165474.2, filed Apr. 7, 2017, the entire disclosure of which is herein expressly incorporated by reference.

BACKGROUND AND SUMMARY OF THE INVENTION

The invention presents a coordinate encryption method and system, which is tailored to encrypt coordinates, in particular coordinates of geographical positions as, e.g., obtained from a positioning unit. The positioning unit can obtain global positioning signals and determine a coordinate set for the position based on the received global positioning signals. The positioning unit can e.g. receive signals from a GPS, Glonass, Beidou and/or Galileo global positioning system.

Vehicle manufacturers connect their vehicles to so-called backend systems, e.g. computer, cloud, or server systems or clusters, in order to support a user with services and to enable technologies such as autonomous driving. For autonomous or driverless vehicles, such as automobiles or motorcycles, for example, high definition maps (HD Maps) become more important as they are used to obtain detailed information about the vehicles' environment. Based on this information, the vehicle can better react to a situation and can also apply machine learning methods to improve reactions. Results of the information processing are then used to update the maps from which other vehicles, e.g. of a car fleet, can also benefit. In particular, they benefit from the experiences and knowledge of a single vehicle.

The maps used especially for autonomous vehicles, e.g. semi-autonomous or fully autonomous cars, are based on real time data. This real time data include geographical positions, but may also include other aggregated sensor data. Even if the data including geographical positions is completely anonymized, geographical positions still are sensitive data qualified for privacy protection. However, geographical positions are required for map improvement in the backend, i.e. the cloud, computer server or cluster system. For this reason, the sensitive data has to be stored and transmitted securely. For securing the sensitive data transmission, state of the art security mechanisms like transport encryption, private tunneling, and individual certificates can be used.

Of course, sensitive data like the geographical positions, generated in the vehicle, also need to be securely stored in the vehicle and in the backend for later processing. Commonly known encryption methods using AES or 3DES block ciphers can be applied. While providing good security, these algorithms have a key disadvantage: When encoding or encrypting geographical positions with these block ciphers, the data format of the stored information is changed during the encoding or encryption process. For example, an analysis process looking for data adhering to a specific format for geographical positions in a large amount of data will break if the format of the geographical positions is changed to a block cipher. The geographical information being now presented in the changed format can then not be identified as geographical information. For example, using AES for encrypting 100-bit values creates other 100-bit values. However, this block cipher is not suitable and efficient for the geographical positions. The format produced by AES would vary greatly from the desired format.

The invention therefore provides a method and system for coordinate encryption in accordance with embodiments of the invention.

In a first aspect, a coordinate encryption method is provided, comprising the steps of (a) encoding a coordinate with an encryption algorithm, (b) testing whether the result of the encoding is within a predefined range, and (c) outputting the result of the encoding in case the result of the encoding is within the predefined range.

The encryption algorithm can be a SPECK encryption algorithm, preferably with a 48 bit block cipher.

Steps a. and b. can be performed repeatedly until the result of the encoding is within the predefined range.

Before step a. the coordinate, preferably in a decimal degree representation, can be transformed into a binary representation, preferably a 48 bit binary representation, and in particular a fix point representation.

In the binary representation one bit can be used for the sign, 8 bit can be used for the integer value, and 39 bits can be used for the fraction.

After step b., the binary representation can be transformed into the coordinate, preferably in a decimal degree representation.

A format of the encoded coordinate and/or the output result can correspond to a format of the coordinate.

The result can be output to a storage device for storing the result.

The border values of the predefined range can be −180, −90, 0, 90, and/or 180, and the range can be from −90 to 90 and/or −180 to 180. The ranges can be predefined for latitude and/or longitude coordinates, and separate ranges for longitude and/or latitude coordinates can be defined.

The coordinate, in particular a coordinate of geographical position, is a longitude or latitude of a geographical position.

For the encoding a passphrase can be used.

The coordinate encryption method or a coordinate decryption method can comprise the steps of decoding the result of the encoding with a decryption algorithm, testing whether the result of the decoding is within the predefined range, outputting the result of the decoding as the geographical coordinate in case the result of the decoding is within the predefined range.

In another aspect, a coordinate encryption system is provided, comprising a storage device configured to store at least one coordinate, and a processor configured to perform the method as disclosed herein. The coordinate encryption system can comprise a positioning unit, configured to determine at least one coordinate of a geographical position and to store the at least one coordinate in the storage means. The system can comprise a communication unit, configured to send the result to a remote processing system. In the remote processing system, which is typically a computer system, cluster or cloud, additional processing steps and, in particular, algorithms working on coordinates can be performed. Therefore, additional services can be provided based on the data transmitted to the remote processing system by the coordinate encryption system.

In yet another aspect, the invention provides a vehicle with a coordinate encryption system as disclosed herein. In particular, a large number of vehicles submit their data in encoded format to the remote processing system.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically illustrates the inventive method.
FIG. 2 illustrates a recursive encryption and decryption process.
FIG. 3 shows comparison of benchmarking results.

DETAILED DESCRIPTION OF THE DRAWINGS

Figure 4:
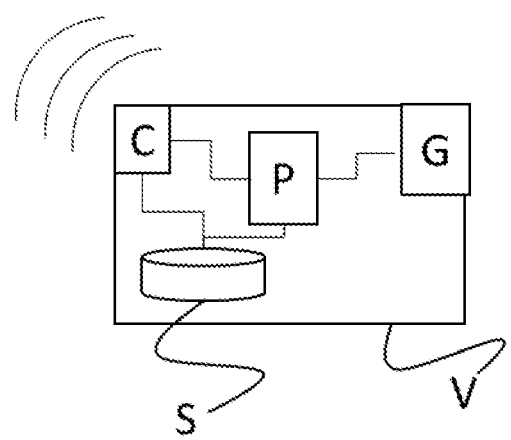
FIG. 4 shows a coordinate encryption system according to the invention.

The invention presents a method, which has the advantage of being faster than traditional block ciphers and can be processed efficiently with the limited resources in the vehicle. This allows maintaining the coordinate format even for encrypted coordinates. This ensures that, even if encrypted multiple times, the result is still recognizable as a coordinate.

One known class of algorithms is Format-preserving encryption (cf. https://en.wikipedia.org/wiki/Format-preserving_encryption). It was proven that the FPE encrypted cipher is as secure as the block cipher algorithm that is used to create it. This is valid for, amongst others, the FPE creation method "cycle walking" (cf. https://en.wikipedia.org/wiki/Format-preserving_encryption#FPE_from_cycle_walking). The cycle walking mechanism encrypts the given value recursively with the block cipher algorithm until the resulting value is in the allowed space. The resulting cipher length depends on the length of the underlying block cipher.

The coordinates of geographical positions are in latitude and longitude, preferably in a decimal degree annotation, which is an alternative to using degrees, minutes, and seconds (DMS). Latitude values are bounded by ±90° and longitude values are bounded by ±180°. The allowed range of the data for the latitude hence is [−90;90] and for longitude is [−180;180]. However, in case the coordinates are mathematically shifted, e.g. to be only positive or negative, the boundaries need to be correspondingly adapted, e.g. for 0° to 180°, 0° to 360°, −180° to 0°, or −360° to 0°, respectively.

Latitude and longitude geographic coordinates can be expressed as decimal fractions. In the decimal degree format they are decimal fractions and they are continuous and have variable decimal places length. The decimal places are usually not longer than eight digits, therefore geographical coordinates form a finite space. The decimal places define the accuracy the geographic data allows (e.g. 6 decimal places allow to define a point with an accuracy of 45-100 mm, 8 places allow the tracking of tectonic plate movements, cf. https://en.wikipedia.org/wiki/Decimal_degrees).

The method now chooses a block cipher from the SPECK family of lightweight block ciphers publicly released by the National Security Agency (NSA) in June 2013. SPECK has been optimized for performance implementations.

The SPECK block cipher family supports a variety of block and key sizes. A block can be two words, but the words may be 16, 24, 32, 48 or 64 bits in size. The invention particularly selects SPECK with a block size of 48 bits. An encrypted 48 bit block cipher is created based on a given 48 bit input and passphrase. SPECK can be computed with limited resources and hence proved to be suitable for in-vehicle application. The 48 bit block cipher is then treated as a 48 bit number in the binary format.

The decimal geographical coordinate is now encoded in a binary format with one bit for the sign (0 is positive, 1 is negative), 8 bits for the integer value (maximum of decimal 180 left of the decimal point is smaller than $2^8$, e.g. 145 of longitude −145.61604366 is 1001 0001 in binary), and 39 bits for the fraction portion right of the decimal point (e.g. 61604366 of longitude −145.61604366 is 11 1010 1100 0000 0010 0000 1110 in binary, which uses 26 of the remaining 39 places). SPECK works on a low binary level and generates random byte-strings, which are then interpreted as numbers. Side effects with two-complement or little-/big-endian encoding are possible. A new fix point representation to interpret the generated random byte-strings as numbers, which are close to or in the range of geographical coordinates is shown below (the lowest or least significant bit of the number is denoted with an arrow):

```
0 00000000 000000000000000000000000000000000000000
│ │└──────┘└─────────────────────────────────────┘
└─┘ Integer                Decimal
Sign
```

The fix point representation ensures that encoding and decoding always leads to a result which is in the form of a valid geographical coordinate. Using block ciphers of lager size would lead to results that deviate much further from the desired coordinate format. With a geographical coordinate encoded as a binary string according to the fix point representation, a cycle walk can be performed.

FIG. 1 schematically shows the principle steps of the methods disclosed herein. In step S11, the geographical coordinate is encrypted with the encryption algorithm using up block cipher. In step S12, it is checked whether the result of the encoding or encryption performed in step S11 is within the predefined range, especially the range defined for geographical coordinates in the coordinate representation used. If this is not the case (path N), the result of the encoding is encoded again using the same encryption algorithm. In case the result of the encoding is within the range predefined (path Y), the result of the (last) encryption is output in step S13.

Further, additional steps S21 and S22 are shown in FIG. 1. Step S21 is arranged before step S11. In step S21 a transformation of the coordinate, which is typically in decimal degree representation, into a binary representation is performed. In step S22, which is arranged between step S12 and step S13, a representation of the encoding result is transformed from the binary representation into the coordinate representation, which is typically the decimal degree representation. Of course, step S22 can also be performed after step S13, which means that the transformation into a coordinate representation typically used can be performed on the result of the last encoding.

More concretely, first the 48 bit binary string representation of a geographical coordinate of a position is encoded using the SPECK algorithm. For the encoded coordinate it is then checked whether the result of the encoding, the encrypted cipher, is a valid range, in particular in a range used for geographical coordinates. In this step, the fix point format has to be checked and it has to be tested, whether the encoded coordinate is in the range according to the fix point representation. If this is not the case, the yet encoded coordinate is encoded again, and, again, it is checked whether the coordinate, now encoded two times, lies within the range. This can be repeated until the encrypted cipher is in the range. If this is the case, the binary representation of the encoded coordinate is transformed to a representation typically used for coordinates, e.g. a decimal degree representation.

The decimal degree representation adheres to the format for geographical coordinates and can be stored in a storage system or database, which in particular expects input in the format of geographical coordinates. While from the view of the storage system a coordinate is stored, the stored coordinate does not allow an identification of the original coordinate.

However, methods working on stored data expecting data in the format of geographical coordinates can identify and check that data in the expected format (decimal degree) is present, although the actual coordinate is hidden from them. For example, a method counting a number of stored coordinates, which are defined by the format expected for geographical coordinates will be able to count the correct number of coordinates while the method would not be able to see what coordinates are stored. Being able to identify and use data that is identified by a specific format (e.g. by a regular expression) is especially useful when processing and integrating data of unknown structure.

In each encoding step a passphrase can be used for the encoding, while in each step the same or different passphrases can be used. In an infinite domain the recursion always terminates. Also, the number of cycles does not have to be saved in order to decrypt the encoded coordinate.

In FIG. 2 the recursive encoding used by the method is illustrated. The original geographical coordinate $W_{pt}$ (in the fix point notation) is encoded or encrypted (both terms are used synonymously herein) using the SPECK algorithm. The result is the encrypted coordinate $W_1$, where 1 indicates that the encryption was performed one time. Consequently, $W_2$ denotes an encryption for the second time and $W_n$ denotes that an encryption was performed for the n-th time, where n is a natural number. After the encryption it is checked whether the encoded coordinate or cipher is in the expected range. If this is not the case, the encoded coordinate or cipher is encrypted again and it is also checked again if the encoding result is within the range. These steps are repeated until the check is positive, i.e. it is found that the encoded coordinate is in the range. The process terminates in the final cipher $W_{fpe}$ produced through the iterations from geographical coordinate. A lightening flash symbol in FIG. 2 indicates an unsuccessful, i.e. negative check result.

For decoding or decryption (both terms are used synonymously herein) of the final cipher $W_{fpe}$, i.e. the geographical coordinate that was possibly encoded multiple times, the process is used in reverse. The final cipher $W_{fpe}$ is decoded (e.g. using one or more passphrases) and it is checked, whether the result of the decoding is within the range. The decoding is repeated until a decoding result lies within the range. This decoding hence terminates when the check against the range is positive and thereby ensures that the decryption always terminates in the original geographical coordinate. The result within the range is the original geographical coordinate $W_{pt}$.

Since the encryption should be performed in a vehicle, resource consumption and speed is an issue. In a benchmark with publicly available geo data with more than 1.2 million coordinates, the performance of the described method labeled "GeoFPE" was evaluated and compared to the use of traditional algorithms like AES or 3DES. The data for the benchmarking in each line of a file contains various data, including coordinates (latitude and/or longitude). The coordinates are identified by a regular expression and then encrypted with method, with AES, and with 3DES. In FIG. 3, the encryption time in milliseconds of the three different implementations is shown.

Even with its several encryption cycles method defined herein outperforms AES on average by 125% and 3DES by 179%. On average, 2.86 recursion rounds are necessary until the algorithm terminates and the value is in the correct range. The maximum number in this experiment were 27 rounds.

The following table shows coordinates and border cases with corresponding coordinates encoded using the described method (passphrase: "012345678"):

| Original Latitude | Original Longitude | Encoded Latitude using GeoFPE | Encoded Longitude using GeoFPE |
|---|---|---|---|
| −28.98476275 | −145.61604366 | 20.221726221795 | −97.447020212222 |
| 14.5990680 | 157.27140080 | 70.473650261971 | 168.239149767803 |
| −78.72519731 | −127.95732308 | 81.499041912185 | 127.183499567120 |
| −87.84772905 | −79.56717918 | 1.427138130944 | −113.265334778016 |
| −83.63490045 | 12.3043864 | −25.440223917856 | 32.271027246471 |
| −54.11012158 | −42.15346654 | −44.542564661844 | −53.314038340728 |
| 6.43288498 | −70.50446815 | 19.82118770460 | −130.285095460394 |
| −60.14053266 | 36.96697311 | −51.511783842621 | −49.112876832125 |
| 40.39504207 | −47.27323698 | −13.518440885434 | −161.109050325101 |
| −61.92264907 | −24.32566607 | 57.87250986382 | 116.268791676527 |
| 66.51808473 | 154.81314910 | −21.342680911143 | 141.76738967966 |
| 15.31857341 | −93.54416058 | −85.201959414345 | −168.125097858775 |
| −32.35491042 | −135.10311484 | −49.360070372837 | 152.449960958261 |
| −81.7832514 | 63.37795104 | 24.10219271948 | −148.207443209101 |
| −58.69552889 | −77.44510159 | 54.156237097446 | 57.441926214785 |
| −31.38419811 | −20.99688920 | 45.12409403275 | −31.547269968679 |
| 21.37194028 | 72.95778969 | 20.502225625443 | 49.325845498886 |
| 0.00000000 | 0.00000000 | 38.547855200937 | −156.25067778205 |
| 90.00000000 | 180.00000000 | 17.7323421559 | 58.518882335134 |
| −90.00000000 | −180.00000000 | 47.229415162476 | −9.327936078595 |

FIG. 4 shows a coordinate encryption system V, which can also be a vehicle, equipped with a processing unit P, a storage device S, a positioning unit G and/or a communication unit C. The processing unit P, the storage device S, the positioning unit G and/or the communication unit C can be directly or indirectly connected. The communication unit C especially communicates with the remote processing system (not shown), especially by a wireless communication and over communication network. The positioning unit G receives global positioning signals and the processing P unit can facilitate encryption and decryption off a coordinate store and storage device S and/or determined by positioning unit G.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of coordinate encryption, the method comprising the steps of:
    a) encoding a coordinate with an encryption algorithm;
    b) testing whether a result of the encoding is within a predefined range; and
    c) outputting the result of the encoding in case the result of the encoding is within the predefined range, wherein a format of the encoded coordinate or the output result corresponds to a format of the coordinate, and steps (a) and (b) are repeated until the result of the encoding is within the predefined range.

2. The method according to claim 1, wherein the encryption algorithm is a SPECK encryption algorithm.

3. The method according to claim 2, wherein the SPECK encryption algorithm has a 48 bit block cipher.

4. The method according to claim 2, wherein steps (a) and (b) are repeated until the result of the encoding is within the predefined range.

5. The method according to claim 1, wherein before step (a) is performed, the coordinate is transformed into a binary representation.

6. The method according to claim 5, wherein the coordinate is in a decimal degree representation, the binary representation is a 48 bit fix point representation.

7. The method according to claim 6, wherein in the binary representation, one bit is used for a sign, 8 bits are used for an integer value, and 39 bits are used for a decimal.

8. The method according to claim 6, wherein after step (b), the binary representation is transformed into the coordinate in a decimal degree representation.

9. The method according to claim 1, further comprising the step of:
    storing the outputted result in a storage device.

10. The method according to claim 1, wherein border values of the predefined range are −180, −90, 0, 90, and/or 180.

11. The method according to claim 10, wherein the predefined range is from −90 to 90 and/or −180 to 180.

12. The coordinate encryption system according to claim 10, further comprising;
    a positioning unit configured to determine at least one coordinate of a geographical position and to store the at least one coordinate in the storage device.

13. The method according to claim 1, wherein the coordinate is a longitude or latitude of a geographical position.

14. The coordinate encryption system according to claim 13, further comprising:
    a communication unit configured to send the result to a remote processing system.

15. The method according to claim 1, wherein a passphrase is used for the step of encoding.

16. The method according to claim 1, further comprising the steps of:
    d) decoding the result of the encoding with a decryption algorithm;
    e) testing whether the result of the decoding is within the predefined range; and
    f) outputting the result of the decoding as the geographical coordinate in case the result of the decoding is within the predefined range.

17. A coordinate encryption system, comprising:
    a storage device configured to store at least one coordinate; and
    a processor operatively configured to:
        a) encode a coordinate with an encryption algorithm;
        b) test whether a result of the encoding is within a predefined range;
        c) output the result of the encoding in case the result of the encoding is within the predefined range:
        d) repeat (a) and (b) until the result of the encoding is within the predefined range.

18. A vehicle comprising a coordinate encryption system according to claim 17.

* * * * *